Figure 1:
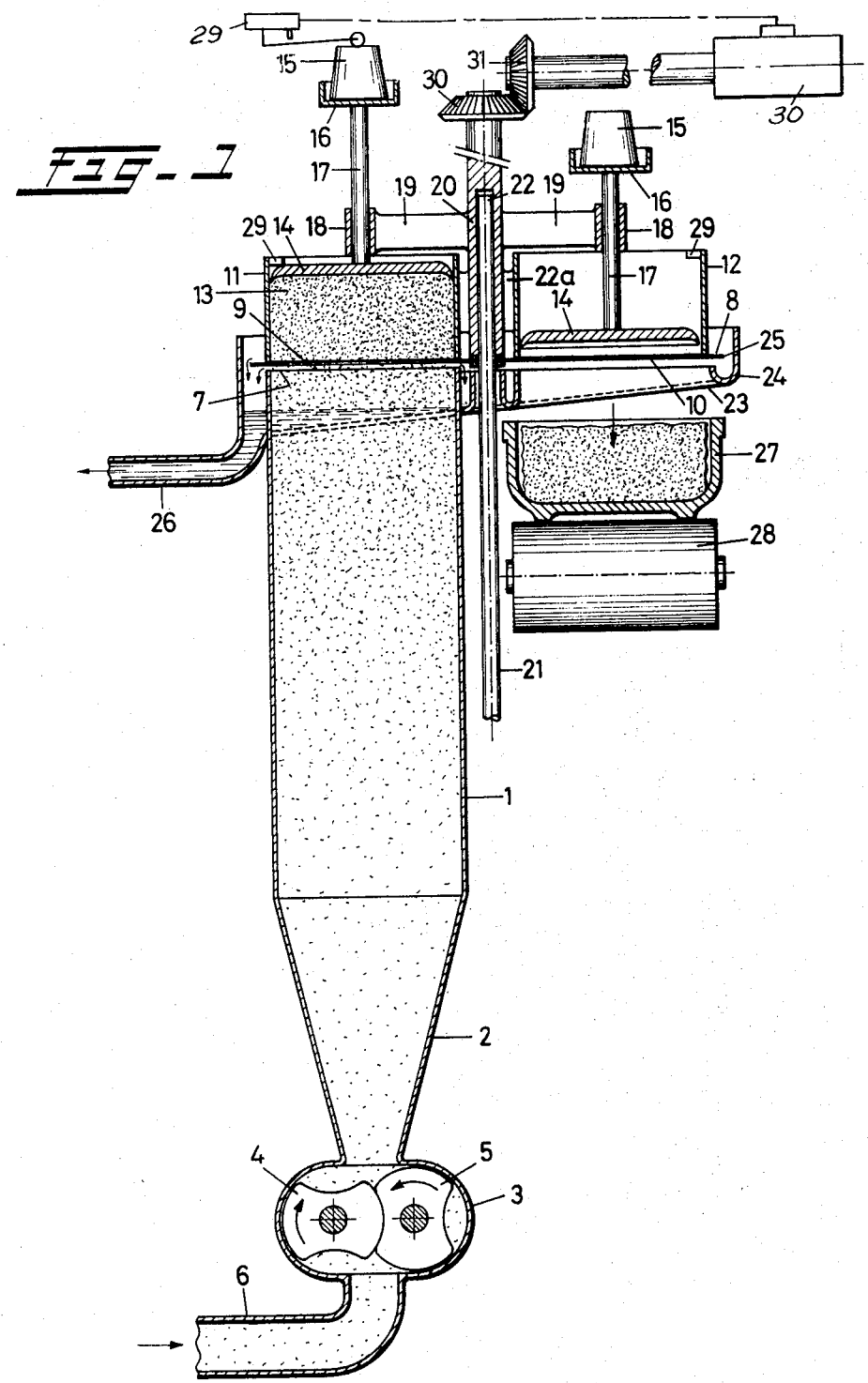

United States Patent [19]
Bronkhorst et al.

[11] 3,774,304
[45] Nov. 27, 1973

[54] APPARATUS FOR DRAINING AND DENSIFYING CURD

[75] Inventors: Armand Francois Bronkhorst, Doorn; Wilhelm Ludwig Heinrich; Ernst Wurdemann, both of Driebergen, all of Netherlands

[73] Assignee: Holvrienka International N.V., Utrecht, Netherlands

[22] Filed: Mar. 17, 1971

[21] Appl. No.: 125,217

[30] Foreign Application Priority Data
Mar. 18, 1970 Netherlands .................... 7003851

[52] U.S. Cl. ............................................... 31/46
[51] Int. Cl. ....................... A01j 25/13, A01j 25/11
[58] Field of Search ................ 31/46, 89; 425/245, 425/246, 261, 289, 317, 302

[56] References Cited
UNITED STATES PATENTS
3,559,287  2/1971  Bronkhorst ............................ 31/46
3,616,594  11/1971  Graf ............................ 425/317 X
3,101,540  8/1963  Dzenis ............................ 31/46 X
3,421,200  1/1969  Stanga ............................ 31/46

*Primary Examiner*—Hugh R. Chamblee
*Attorney*—Cushman, Darby & Cushman

[57] ABSTRACT

A mixture of whey and curd is pumped into a vertical channel and thence into a substantially contiguous curd vessel against the action of a weighted piston movable in said vessel. Unlike previously proposed arrangements, the channel is imperforate except at the junction between the channel and the curd vessel, where whey is continuously allowed to drain off. When the curd vessel has been filled, a rotating cutter plate cuts off the slice of curd in the curd vessel from the remaining curd ribbon in the channel and then froms a supporting bottom for the curd vessel as it is rotated to an unloading position. The curd is thus kept under pressure and is not allowed to relax and draw bacteria-contaminated air into it.

3 Claims, 2 Drawing Figures

Patented Nov. 27, 1973

3,774,304

2 Sheets-Sheet 1

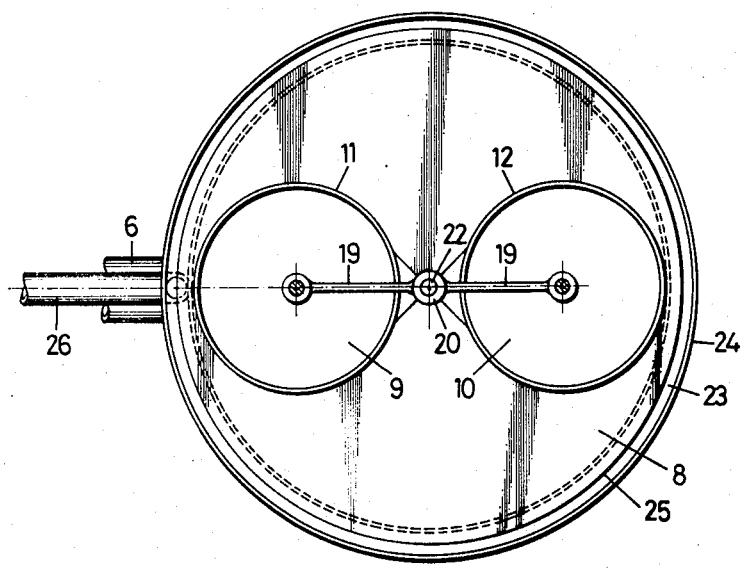

APPARATUS FOR DRAINING AND DENSIFYING CURD

This invention relates to a process and apparatus for draining and densifying curd from a mixture of whey and curd.

A known process comprises raising the curd composition in a vertical channel by means of a pump, forcing curd at the upper end of the channel into a curd vessel passing said end, shearing off the curd ribbon at the upper end of the channel after the curd holder has been filled, and moving the curd holder to a position superjacent to a cheese receptacle, into which the curd vessel is discharged. In this prior arrangement, a portion of the whey is separated from the curd in a separate vessel, and another portion is discharged from the lower end of the vertical channel, for which purpose said lower end is provided with a plurality of outlets. The curd composition raised in the channel is densified owing to the resistance between the channel wall and the curd composition, on the one hand, and owing to the weight of the composition, on the other, which factors act against the pressure from the pump, and is eventually pressed into the curd vessel via the upper end of the channel. When the curd vessel has been filled it is pivoted about a shaft outside the channel but parallel to the axis of the latter from the upper end of the channel to a cheese receptacle, where it is emptied, during which movement a bottom is provided by a separate carrying plate. Since the channel is periodically open at the top, the curd composition can relax during the periodic release of pump pressure, which results in air from the ambient atmosphere being drawn into the curd composition, whereby undesirable bacteria may be entrained into the air pockets being formed in the curd composition.

Consequently, the cheese produced by this prior process does not satisfy the severe requirements of quality.

It is an object of the present invention to improve the process as described above, and thereby to produce cheese of an excellent quality.

According to the invention there is provided a process for draining and densifying curd from a mixture of curd and whey, which comprises raising the curd composition in a vertical channel by means of a pump, forcing the curd at the upper end of said channel into at least one curd vessel passing said end, separating the curd in said vessel from the curd ribbon at the upper end of the channel when said curd vessel has been filled, moving the curd vessel to a position superjacent to a cheese receptacle, and emptying the curd vessel into said cheese receptacle, the improvement being that the whey is discharged in the first place and continuously at the level of the boundary plane between the upper end of the channel and the lower end of the curd vessel, the curd being loaded by a compression member in both the vertical channel and the curd vessel.

It is thus achieved that the channel is filled with the mixture of whey and curd up to the top, so that no air can penetrate between the curd particles. Furthermore, as a result of the compression of the curd as the mixture is raised, the whey moves towards the channel wall, along which it moves to the discharge level, so that when the composition reaches the upper end of the channel the curd has been freed from whey to a substantial extent. By virtue of the fact that the curd ribbon is forced upwardly into the curd vessel against the action of the pressure member, not only is the remaining whey discharged, but the curd composition in the curd vessel is prevented from relaxing during the transfer to the discharging position, and no air is drawn into the curd, the particles of which are more and more fused together. When the curd in the channel relaxes, the entry of air is prevented by the whey, which is present in the channel up to its upper end. On the other hand, in a preferred embodiment of the invention, as will be described hereinafter, the curd is prevented from relaxing.

There is thus produced a highly homogeneous cheese composition, free from infectious germs and air, and hence an excellent quality of the final product.

The invention also provides an apparatus for draining and densifying curd from a mixture of whey and curd, which comprises means for supplying a mixture of whey and curd, a vertical channel in which said mixture can be raised by means of a pump, at least one curd vessel at the top of said channel, said curd vessel being pivotable about a shaft located outside, and parallel to the axis of, the channel for movement from a position in which it can be filled from the channel to a position in which it can be discharged into a cheese receptacle, and vice versa, the channel being provided with means for discharging whey, the improvement being that the channel is arranged for discharging whey in the first place and continuously at the level of the boundary plane between the upper end of the channel and the lower end of the curd vessel, and that the apparatus comprises a compression member movable up and down for subjecting curd in said curd vessel to a compressive load.

Accordingly the upper edge of the channel constitutes the means along which the whey can freely flow away, while the effect of the compression member is controllable by varying its weight.

According to a further feature of the invention, a cutter plate may be arranged in said boundary plane, which is also pivotable about said shaft, and the cutting edge of which is preferably formed by the edge of an opening, whose configuration, size, and distance to the shaft correspond with those of the upper end of the channel and of the cheese receptacle, which plate may have such dimensions that during the movement of the curd vessel it closes the upper end of the channel, so as to prevent relaxation of the curd present therein. It is thus also achieved that the curd ribbon is smoothly cut and does not acquire a rough surface, as is the case when it is sheared off.

It should be noted that a compression member mounted for up and down movement for compressing curd in a perforate curd raising channel is known per se.

One embodiment of the invention will be described, by way of example, with reference to the accompanying drawings, in which FIG. 1 is a longitudinal section through the curd draining device according to the invention; and FIG. 2 is a partly diagrammatic plan view.

The curd draining device for carrying out the method according to the invention consists of a vertically disposed tube 1 having an imperforate wall defining a curd raising channel. The lower part 2 of this tube is funnel-shaped, and the narrow end thereof is connected to a Root type pump 3 having two rotors 4,5. The mixture of curd and whey is supplied through a duct 6 from a reservoir not shown. At the upper end, tube 1 is bounded by a horizontal edge 7. In the example shown, this edge is of circular shape, corresponding to the cross-sectional configuration of tube 1. Naturally the tube and the upper edge may have a square, rectangular, or other shape.

The edge 7 defines the level at which can flow away.

Spaced a short distance above edge 7 is a circular cutter plate 8 rotable about its centre. Curd vessels 11, 12 are connected through short arms 22a to a sleeve 20, which is freely rotatable about a vertical drive shaft 21. The cutter plate is provided with a single opening, the extreme positions of which are indicated by 9 and 10. The circumference of the opening corresponds to the cross-sectional configuration of the channel. As shown in this embodiment, two curd vessels, spaced an annular distance of 180° apart, are disposed on top of the cutter plate. During the transfer of curd composition from the vertical channel, one of the vessels is in register with the opening in the cutter plate. When a sufficient quantity of curd has been loaded in the vessel, the cutter plate rotates rapidly from position 9 to position 10, whereby a disk 13 is smoothly cut off from the curd ribbon, the edge of the opening functioning as cutting edge.

In order to densify the curd composition still further, and hence to squeeze out remaining whey and prevent the penetration of air, a compression plate 14 is mounted for up and down movement in each curd vessel, which plate can be loaded by a given weight 15. A vertical rod 17 is mounted centrally on the top of each plate 14 and carries a dish 16 for receiving a weight at the top. Each rod is guided in a sleeve 18 carried by a radial arm 19 extending from central sleeve 20. This sleeve is fitted onto portion 22 of shaft 21, extending above cutter plate 8, and is driven stepwise in one peripheral direction by means of a gear not shown, the curd vessels rotating along with it. Cutter plate 8, on the other hand, is oscillated between positions 9 and 10, shaft 21 being oscillated by a drive gear not shown. When a slice of curd has been cut off, the opening of cutter plate 8 is in position 10, channel 1 being closed by the imperforate part of the cutter plate, so that there can be no issuance of curd and pressure is maintained therein. The vessel just filled from the channel then moves into register with the opening in the cutter plate to drop its contents through said opening into a cheese mould 27. After this the cutter plate rotates back into position 9, and the other curd vessel will be filled.

A whey collecting dish 23 is disposed at the upper end of the device for collecting whey flowing over the edge 7 as well as whey subsequently squeezed out of the curd composition. The trough-shaped edge 24 of dish 23 extends around the outer circumference 25 of cutter plate 8, while the sloping bottom of the whey collecting dish, also formed with a trough, surrounds the upper end of the channel and is provided with an opening at the position where the curd vessels are discharged. A whey discharge tube 26 is connected to the lowest point of dish 23.

The cheese moulds 27 are supplied on a conveyorbelt 28, shown diagrammatically, on which they are transported further after being filled. The conveyor-belt is arranged to operate intermittently and to supply a series of cheese moulds (not shown) in succession for stepwise, continuous operation of the apparatus according to the invention.

It will be clear that the curd draining device can be modified in structural respects in various minor points without departing from the scope of the invention.

Thus the compression plates may be perforated to allow the escape of air which may be present under the compression plate 14 during the densification of the curd composition in the curd vessel, and to prevent imperfections in the crust of the cheese subsequently formed. To prevent curd from being pressed through the perforations, a fine-mesh nylon gauze is stretched at some distance below the compression plate, for example, from the depending edge thereof.

When the device is automated, a microswitch 29 can be arranged as an actuating member to indicate the uppermost position of the compression plate and thereby to determine the exact extent to which the curd vessel is filled.

We claim:

1. An apparatus for draining and densifying curd from a mixture of whey and curd, which comprises means for supplying a mixture of whey and curd, a vertical channel in which said mixture can be raised by means of a pump, at least one curd vessel at the top of said channel, said curd vessel being pivotable about a shaft located outside, and parallel to the axis of the channel for movement from a position in which it can be filled from the channel to a position in which it can be discharged into a cheese receptacle, and vice versa, the channel being provided with means for discharging whey, the improvement being that the channel is arranged for discharging whey in the first place and continuously at the level of the boundary plane between the upper end of the channel and the lower end of the curd vessel, and that the apparatus comprises a compression member movable up and down for subjecting curd in said curd vessel to a compressive load, the curd vessel is arranged to be closed at its bottom during its movement from the filling position to the discharging position by a plate member, said plate member being a cutter plate movable relative to the upper end of the channel and the bottom of the curd vessel.

2. Apparatus according to claim 1, wherein the cutter plate also closes the upper end of the channel during the movement of the curd vessel.

3. Apparatus according to claim 2, wherein the compression member is guided between an uppermost and a lowermost stop and operates at least one actuating member.

* * * * *